INVENTORS
Jack T. Cornillaud
Douglas J. Wing
BY
O.O. McGraw
THEIR ATTORNEY

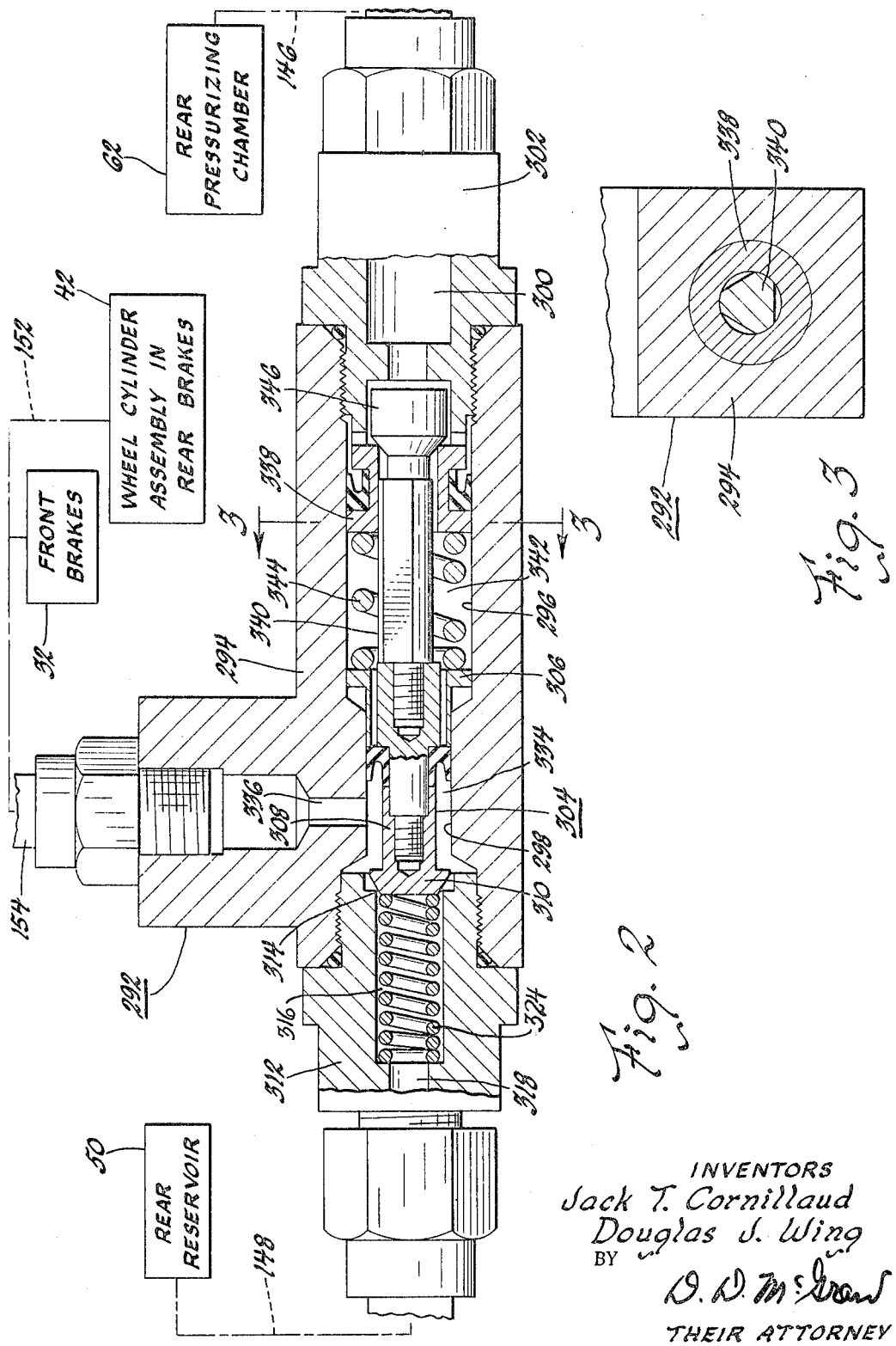

United States Patent Office
3,291,264
Patented Dec. 13, 1966

3,291,264
BRAKE SYSTEM
Jack T. Cornillaud, Dearborn, and Douglas J. Wing, St. Clair Shores, Mich., assignors to General Motors Corporation, Detroit, Mich., a corporation of Delaware
Filed Dec. 7, 1964, Ser. No. 416,292
13 Claims. (Cl. 188—152)

The invention relates to a brake system and more particularly to such a system in which a first brake assembly or assembly group is energized and the torque reaction resulting from such energization is utilized to energize another brake assembly or assembly group. It is particularly contemplated that the invention be utilized in a vehicle having front and rear brakes, with the torque reaction resulting from energization of the rear brakes normally being used to provide energizing forces to energize the front brakes.

It has been previously proposed to provide a fluid brake system wherein one or more primary brake assemblies are pressure energized through a first fluid system, with pressure generating wheel cylinder being provided in such brake assemblies to utilize the torque reaction of the brakes to pressurize a second fluid system which in turn pressurizes another, secondary, set of brakes. In utilizing the invention in such a brake system, it is now proposed that pressure generated at the same time that the primary set of brakes are energized be utilized to actuate a compensating valve for the second fluid system. It is also proposed that a pressure so generated be utilized to provide a back-up pressurizing circuit for the second fluid system so that if for any reason insufficient pressure is provided by torque reaction of the primary set of brakes, the secondary set of brakes may still be effectively energized. Structure embodying the invention is also operable to compensate the second pressurizing circuit or system either at the beginning of secondary brake actuation or upon brake release, or both, by utilization of fluid pressurized when the primary set of brakes are normally being energized. The invention has particular applicability to vehicles having divided brake systems for the front brakes and rear brakes for safety purposes, and provides the additional feature over such systems now in common usage in that a third fluid circuit provides a back-up for one of the circuits supplying one of the sets of brakes. In the preferred embodiment of the invention the systems for the two sets of brakes are maintained fluidly separate so that loss of fluid from one system will not cause loss of fluid from both systems. A brake system of the torque reaction energization type gives many of the advantageous effects of power brakes without requiring a brake booster such as is now provided in that all of the braking forces need not be supplied by the vehicle operator through the brake pedal. This is accomplished by utilizing the torque reaction forces normally delivered to brake shoe anchoring mechanisms.

In the drawings:

FIGURE 1 schematically illustrates a complete brake system, with parts broken away and in section, which embodies the invention.

FIGURE 2 illustrates a modified valve assembly with parts broken away and in section.

FIGURE 3 is a cross section view taken in the direction of arrows 3—3 of FIGURE 2.

Figure 1:
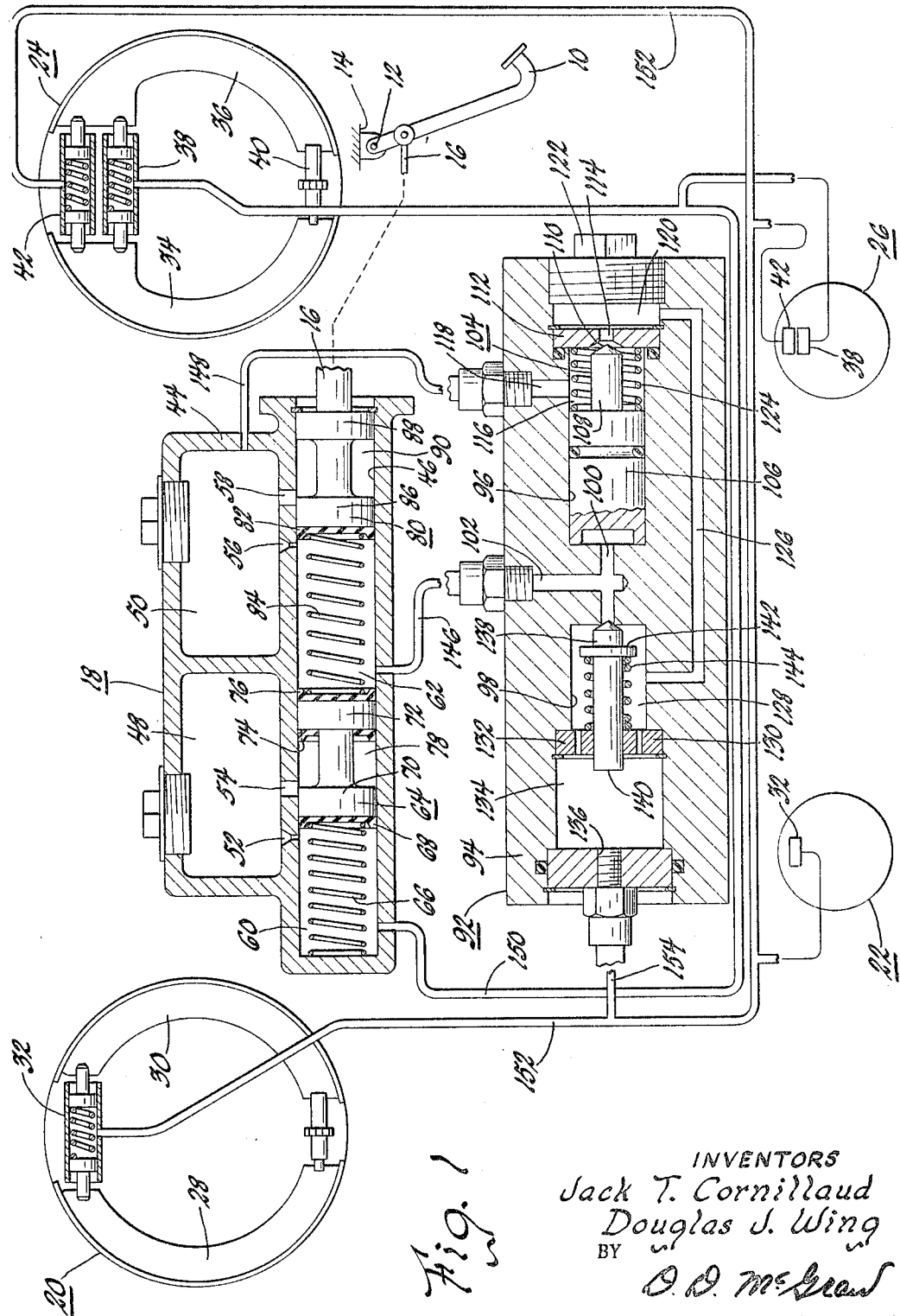

The brake system in which the invention is embodied includes a brake pedal 10 pivotally mounted in a suitable manner at 12 to a portion 14 of the vehicle in which the brake system is installed. A push rod 16 pivotally connects the pedal 10 to the master cylinder assembly 18. The vehicle is illustrated as being equipped with front wheel brake assemblies 20 and 22 and rear wheel brake assemblies 24 and 26. As shown in detail with regard to assembly 20, the front wheel brakes include brake shoes 28 and 30 actuated by pressurizing a wheel cylinder assembly 32 to engage a brake drum. The brakes shown are of the duo servo type in common usage, but may be of any other suitable type.

Each rear brake assembly, as exemplified by assembly 24, includes a pair of brake shoes 34 and 36 and a wheel cylinder assembly 38. When the wheel cylinder assembly 38 is pressurized shoes 34 and 36 are expanded into contact with a brake drum for braking action. Assembly 38 is positioned at the upper ends of the brake shoes while the lower ends of the brake shoes are connected through the adjuster 40. The rear brake assemblies are therefore also of the duo servo type. A second wheel cylinder assembly 42 is provided in each rear wheel brake assembly at the upper ends of the shoes 34 and 36 and in the position usually occupied by a shoe anchor. Wheel cylinder assembly 42 is arranged to generate fluid pressure from the brake reaction force normally applied to a shoe anchor pin. Thus, the basic brake system is generally similar to that of U.S. Patent 2,385,812, Hoyt.

The master cylinder assembly 18 has a housing 44 in which a bore 46 is formed extending underneath separate brake fluid reservoirs 48 and 50. In some instances a common reservoir may be used, but it is generally preferable to have separate reservoirs for safety reasons. Compensating ports 52 and 54 connect bore 46 with reservoir 48 and similar ports 56 and 58 connect bore 46 with reservoir 50. Bore 46 is divided into pressurizing chambers 60 and 62 by a spool piston 64 reciprocably received therein. Chamber 60 is formed at the inner end of the bore so that when piston 64 is in the inactive position shown in the drawing, compensating port 52 connects reservoir 48 with the chamber. A piston return spring 66 in chamber 60 holds a piston seal 68 in place against the land 70 of the piston. The piston land 72 has seals 74 and 76 on opposite sides thereof. The chamber 78 formed by lands 70 and 72 and bore 46 is connected to the reservoir 48 through port 54. Another piston 80 is received in bore 46 and provided with a seal 82 and a piston return spring 84. One end of spring 84 rests against seal 76 so that the spring is positioned between the pistons 64 and 80. Piston 80 has spaced lands 86 and 88 which cooperate with bore 46 to define chamber 90. This chamber is connected to reservoir 50 through port 58. Port 56 connects reservoir 50 with chamber 62 when piston 80 is in the inactive position shown in the drawing. Suitable ports may be provided in lands 70 and 86 of the pistons for fluid compensation purposes as is well known in the art. The push rod 16 is suitably connected to move piston 80 reciprocably in bore 46 to actuate the master cylinder assembly.

A valve assembly 92 is connected in a manner to be described to the master cylinder assembly 18 and the various wheel brake assemblies. Assembly 92 includes a housing 94 in which is formed a first bore 96 adjacent one end and a second bore 98 adjacent the other end. Bores 96 and 98 are connected at their inner ends by a passage 100 which in turn connects with passage 102 returning to the outside of the valve assembly. A compensating valve assembly 104 is provided in bore 96. Assembly 104 includes a piston 106 sealingly and reciprocably mounted in the inner end of bore 96 adjacent passage 100. Piston 106 has a reduced outwardly extending section 108 terminating in a valve 110. An orifice plate 112 is sealingly secured in an enlarged outer end of bore 96 and is provided with an orifice 114 arranged to cooperate with valve 110 to be opened and closed in a manner to be described. A chamber 116 is provided between piston 106 and orifice plate 112 in bore 96 and is connected to a passage 118 returning to the exterior of the valve assembly 92. On the other side of orifice plate 112 a chamber 120 is formed in the enlarged portion of bore 96 and is suitably sealed by bore plug 122. Piston 106 is urged to the left by spring 124 which therefore tends to hold valve plunger 110 away from the seat of orifice 114. Thus, chambers 116 and 120 are normally in fluid communication. Passage 126 formed within housing 94 returns from chamber 120 to a chamber 128 formed in a portion of bore 98 to be described.

Bore 98 has the inner end thereof forming the chamber 128. A valve guide plate 130 defines the outer end of chamber 128. Plate 130 has passages 132 extending therethrough to fluid connect chamber 128 with chamber 134 on the other side of the plate and in the outer portion of bore 98. Chamber 134 is connected through passage 136 to the exterior of valve assembly housing 94. A pressure regulator valve 138 is reciprocably mounted through the valve guide plate 132 so that its rear end 140 extends into chamber 134 and is exposed to pressure therein. The valve is provided with a spring seat collar 142 and a spring 144 in chamber 128 so that the spring urges the valve to the right to normally hold the valve closed against a seat formed in the end of passage 100 connecting with bore 98.

The various fluid conduits interconnecting the master cylinder 18, the valve assembly 92, and the various wheel cylinders and forming the fluid circuits of the system will now be described. Line or conduit 146 interconnects master cylinder pressurizing chamber 62 with the valve assembly passage 102. Line 148 interconnects the master cylinder reservoir 50 and the valve assembly passage 118. Line 150 interconnects the master cylinder pressurizing chamber 60 and the brake apply wheel cylinders 38 of the rear wheel brake assemblies. Line 152 interconnects the pressure generating wheel cylinder assemblies 42 of the rear wheel brake assemblies and the wheel cylinders 32 of the front wheel brakes. This line is also connected through branch line 154 with passage 136 of the valve assembly 92.

The operation of the system is as follows: The system is shown in the brake release position. It is assumed that hydraulic fluid is in all of the lines or conduits, in the various bores and chambers of the valve assembly 92 and the master cylinder assembly 18, and in the reservoirs 48 and 50, as well as the various wheel cylinder assemblies. When the brake pedal 10 is depressed, piston 80 is moved to the left so that its seal 82 closes port 56 and fluid in chamber 62 is pressurized. This pressure is transmitted to piston 64 together with a portion of the pedal apply force being transmitted through spring 84. The pressure generated in chamber 62 passes through line 146, passage 102, and passage 100. It acts on piston 106 to move the piston to the right against the force of spring 124, preferably at approximately 15 p.s.i. This seats valve 110 to close orifice 114. The pressure in passage 100 at this time has no effect on the pressure regulator valve 138 to move it since spring 144 and the area of the seat formed by passage 100 is preferably calibrated to require approximately 150 p.s.i. in passage 100 to unseat the valve, assuming no pressure in chambers 128 and 134.

The pressure in chamber 62 and the force exerted through spring 84 act on piston 64 to move that piston to the left in bore 46. The piston cup seal 68 closes compensating port 52 and the piston pressurizes fluid in the chamber 60 while compressing spring 66. This pressure is transmitted through line 150 to the brake apply wheel cylinders 38 in the rear wheel brake assemblies. The forces exerted by the wheel cylinders 38 actuate the brake shoes so that they engage the brake drums and a braking action is obtained. The torque of each turning brake drum applies a force to the brake shoes as a result of the mechanical servo action in duo servo type brakes. Normally, this force is transmitted to a brake shoe anchor pin which holds the upper end of the secondary shoe in place. In the particular brake system in the drawing, however, this force causes pressure to be generated in each wheel cylinder 42. This pressure is transmitted through line 152 to the front wheel brake wheel cylinders 32 to actuate the front wheel brakes. The pressure is also transmitted through branch line 154 to the valve assembly chamber 134. The pressure acts on pressure regulator valve 138 to reinforce spring 144 in holding the valve closed. Thus, the front wheel or secondary pressure system or circuit is separated from the pressure system or circuit containing line 146. The pressure in the secondary system also exists in chamber 128, passage 126, and chamber 120 of the valve assembly. Should the secondary system pressure in chambers 134 and 128 become or be insufficient to actuate the front brakes, the pressure regulator valve 138 is opened at a predetermined pressure differential between the pressures generated by wheel cylinders 42 and piston 80 in chamber 62. As noted above, this differential may be approximately 150 p.s.i., and is determined by the characteristics of spring 144 and the area of the valve seat formed by the end of passage 100 at chamber 128. Thus, when the secondary line pressure of line 152 is insufficient, pressure generated in chamber 62 of the master cylinder assembly passes through passage 100, chamber 128, passages 132, chamber 134, passage 136, and branch line 154 to line 152 to actuate the front wheel cylinders 32. Also, when the brakes are quickly applied, pressure from chamber 62 may build up to a pressure differential of 150 p.s.i. or more in relation to pressure in chambers 128 and 134 from cylinders 42, thus initially actuating the front wheel brakes momentarily until the pressure differential falls below 150 p.s.i. and valve 138 is closed.

Upon release of the brake pedal 10 by the vehicle operation, spring 66 returns piston 64 to the right. This also affects spring 84 and fluid in chamber 62 in addition to the expanding action of spring 84, returning piston 80 to the right. Thus, pressures in chambers 60 and 62 are lessened. Each rear apply wheel cylinder 38 is then moved by suitable retraction mechanisms to release the rear brakes. Also, since the pressure in chamber 62 is decreased, the spring 124 will move piston 106 to the left, aided by the secondary system pressure in chamber 120 acting on valve 110, venting the secondary system to the reservoir 50 through orifice 114, passage 118, and line 148. Thus, the wheel cylinders 32, 38 and 42 are returned to the inactive position and the brakes are released.

The modified valve assembly 292 of FIGURE 2 is connected to the master cylinder assembly 18 in a similar manner to that of valve assembly 92 of FIGURE 1. Assembly 292 includes a housing 294 with a bore formed therein and comprised of a first bore section 296 adjacent one end and a second bore section 298 adjacent the other end. The right end of bore section 296 communicates with chamber 300 formed in the adapter 302. The line or conduit 146 of the schematic brake system of FIGURE 1 is connected to communicate with chamber 300 and with the rear pressurizing chamber 62 of the master cylinder assembly. A compensating valve assembly 304 is provided in bore section 298. Assembly 304 includes a piston 306 sealingly and reciprocably mounted in the inner end of bore section 298 and having an enlarged section reciprocably mounted in the inner end of bore section 296. Piston 306 has a reduced outwardly extending section 308 terminating in a valve 310. An adapter 312 is threaded and sealed to the outer end of the enlarged part of bore section 298 and is provided with an orifice or valve seat 314 arranged to cooperate with the valve 310 to be opened and closed in a manner to be described. A chamber 316 is provided in adapter 312 and communicates with the orifice 314 and passage 318 returning to the exterior of valve assembly 292. Passage 318 is connected to line or conduit 148 and then to the rear reservoir 50 of the master cylinder illustrated in FIGURE 1. A spring 324 in chamber 316 urges valve assembly 304 to the right and, therefore, tends to hold valve 310 away from the valve seat or orifice 314. The chamber 334, defined by a part of bore section 298 and in which the valve 310 is movable, is connected by passage 336 to line or conduit 154 of the system of FIGURE 1 which in turn communicates with line or conduit 152 providing fluid communication between the front brakes 32 and the rear brake wheel cylinder assemblies 42. An annular valve assembly 338 is reciprocably received in bore section 296 and about the rear extension 340 of piston 306. Valve extension 340 is piloted in assembly 338 and it is generally triangular in cross section with rounded corners, as better seen in FIGURE 3. By means of this construction passages are provided which connect chamber 342 with the entire length of the central passage through assembly 338. Spring 344 is received in chamber 342 and acts on the enlarged portion of valve assembly 306 which is piloted in bore section 296 and also on valve assembly 338. Spring 344 is a compression spring. The spring causes the valve head 346, which is at the extreme rear end of valve assembly 306, to normally be seated on the valve seat formed at the rear end of valve assembly 338.

The area of bore section 296 and the force of spring 344 cooperate to determine the pressure required to obtain fluid flow from chamber 300 to passage 336 through valve 338. In the illustrative example of FIGURES 2 and 3, the areas of valve seat 314, bore 298 and bore 296 are such that the pressure in chamber 300 will hold valve 314 closed as long as the pressure in chamber 334 does not exceed a value equal to 7½ times the pressure in chamber 300. The pressure in chamber 300 is the pressure generated in the rear master cylinder pressurizing chamber 62, and the pressure in chamber 334 is the pressure generated by the wheel cylinder assemblies 42 in the rear brakes. It is clear that brake actuation is normally obtained by pressure generated in the master cylinder assembly and acting in the rear brake wheel cylinders 38 insofar as the rear brakes are concerned, and the front brakes are actuated by pressure generated in wheel cylinder assemblies 42. If, however, for some reason the fluid pressure generated in chamber 334 exceeds the design limit ratio in relation to the pressure in chamber 300, valve 310 opens and the pressure is relieved through passage 318 and conduit 148 to the rear reservoir 50.

The system utilizing either valve assembly includes several circuits, one of which when pressurized by the master cylinder assembly actuates the rear brakes, another of which is pressurized by the torque reaction obtained by actuation of the rear brake to actuate the front brakes, and another which acts in conjunction with the last mentioned circuit to control compensation of that circuit and also serve as a back-up circuit to actuate the front brakes if for some reason the rear brake torque reaction does not produce sufficient pressure to actuate the front brakes. This last circuit also has the additional function and capability of initially pressurizing the front wheel brakes when the pressure buildup in it occurs such that it is well above the pressure in the circuit pressurized by brake torque reaction. Therefore the circuit containing the front wheel brakes may be supplied with some additional fluid upon brake application and at no time will suffer an appreciable delay in application of the front wheel brakes relative to the rear wheel brakes. This is advantageous where the rear wheel brakes may not operate properly to pressurize the front wheel brakes immediately or fully.

More specifically, mechanism embodying the invention, when utilized in a rear brake torque energization system normally energizes the front wheel brakes by torque reaction of the rear wheel brakes. However, when such braking action is insufficient, the front wheel brakes are energized by a master cylinder pressurizing piston other than the rear wheel brake pressurizing piston, thus maintaining separate fluid pressurizing action in the two brake actuating systems with an emergency action for one of the systems. At the same time the valve assembly permits compensation of the secondary system actuating the front wheel brakes upon each brake actuation. Fluid compensation is provided from the same reservoir which provides fluid for the emergency secondary system actuation. A separate reservoir is preferably provided for the primary system which includes the rear brake apply wheel cylinder and the conduits associated therewith.

The invention may be utilized with brakes other than duo servo brakes so long as one brake assembly or assembly group accomplishes energization of another brake assembly or assembly group in response to brake actuation of the one brake assembly or assembly group. For example, torque reaction responsive disc brakes may be utilized as rear brakes. Furthermore, it is within the purview of the invention to incorporate it in structures other than vehicles, or to utilize the front brakes to energize the rear brakes, or to utilize brakes on one axle of a multiple front or rear axle vehicle to normally energize brakes on another axle in the same general location on the vehicle.

In the claims:

1. In a brake system comprising a master cylinder assembly with first and second fluid pressurizing chambers and first and second fluid reservoirs respectively supplying fluid for said chambers, a first brake system actuated by pressurized fluid from said first fluid pressurizing chamber, a second brake system including a pressure generating cylinder assembly actuated by brake reaction of said first brake system, means controlled by pressure from said second fluid pressurizing chamber for venting said second brake system to said second reservoir until pressure in said second fluid pressurizing chamber reaches a predetermined pressure level, and means supplying fluid to said second system from said second fluid pressurizing chamber until pressure generated by said pressure generating cylinder assembly approaches pressure from said second fluid pressurizing chamber to a predetermined pressure differential, and cutting off fluid from said second system so long as the predetermined pressure differential is at least maintained.

2. A brake system having first and second fluid pressurizing means actuatable by a common member, third fluid pressurizing means actuated by brake reaction from a first brake actuated by said first fluid pressurizing means, a second brake selectively actuated by pressure from said second and third fluid pressurizing means, and means controlling selection of the pressurizing means which will actuate said second brake in accordance with a pressure differential between the pressures produced by said second and third fluid pressurizing means.

3. In the brake system of claim 2, means pressure venting said second brake only when the pressure from said second pressurizing means is less than a predetermined pressure differential in comparison to pressure from said third pressurizing means.

4. In the brake system of claim 2, said controlling means being pressure comparison valve means having means establishing a predetermined pressure differential below which said second fluid pressurizing means pressurizes said second brake when said brake system is actuated.

5. In a brake system having a master cylinder assembly with a fluid reservoir and first and second fluid pressurizing chambers, a first wheel brake assembly receiving pressurized fluid through a first fluid circuit from said first fluid pressurizing chamber for brake actuation, a fluid pressurizing wheel cylinder assembly in said first wheel brake assembly actuated by first wheel brake assembly brake reaction, a second wheel brake assembly receiving pressurized fluid through a second fluid circuit from said fluid pressurizing wheel cylinder assembly for brake actuation, a control valve assembly having valve means connected to said second fluid circuit to vent said second fluid circuit to said master cylinder assembly reservoir and further connected to receive pressurized fluid from said second fluid pressurizing chamber and close said valve means at a predetermined pressure level of pressurized fluid from said second pressurizing chamber over the level of pressurized fluid from said fluid pressurizing wheel cylinder assembly.

6. In the brake system of claim 5, a pressure regulator valve fluid connected to said second fluid circuit and said second fluid pressurizing chamber and arranged to be opened by pressure from said second fluid pressurizing chamber at and below a predetermined pressure differential of pressures from said second fluid pressurizing chamber and said fluid pressurizing wheel cylinder assembly.

7. A brake mechanism having a primary brake system including first fluid pressurizing means and first conduit means connected therewith and first pressure actuated brake means fluid connected with said first conduit means to receive brake actuating fluid pressure from said first fluid pressurizing means, a secondary brake system including second fluid pressurizing means and second conduit means and second pressure actuated brake means fluid connected with said second conduit means to receive brake actuating fluid pressure from said second fluid pressurizing means, third fluid pressurizing means acting in concert with said first fluid pressurizing means, third conduit means receiving pressure from said third pressurizing means, and control means fluid connected with said second conduit means and said third conduit means and controlling pressure energization of said second pressure actuated brake means in response to a predetermined pressure differential of the pressures delivered to said control means by said second and third pressurizing means.

8. The brake mechanism of claim 7, said control means being a normally open pressure responsive valve venting said second conduit means and closed by pressure from said second fluid pressurizing means upon the attainment of said pressure differential.

9. The brake mechanism of claim 7, said control means being a normally closed pressure differential responsive valve receiving pressures from said second and third fluid pressurizing means in opposed relation and opened only when said pressure differential is attained to admit pressure from said second pressurizing means to said second conduit means.

10. A brake system having a first brake assembly, a second brake assembly, first fluid pressure means for energizing said first brake assembly, second fluid pressure means responsive to fluid pressure energization of said first brake assembly and energizing said second brake assembly, and valve means responsive to the relative fluid pressure energization levels of said first and second energizing means for selectively fluid connecting said second brake assembly in fluid communication with said second energizing means for fluid pressure energization by said second energizing means above a minimum fluid pressure energization level differential and fluid connecting said second brake assembly in fluid communication with said first energizing means for energization by said first energizing means below the minimum fluid energization level differential.

11. In the brake system of claim 10, said first energizing means including first and second fluid pressure energy level producing means with said first fluid pressure energy level producing means fluid pressure energizing said first brake assembly and said second fluid pressure energy level producing means acting on said selective fluid connecting means and selectively fluid pressure energizing said second brake assembly.

12. In a brake system having first pressure generating means, first brake means applied by pressure from said first pressure generating means and second pressure generating means generating pressure in accordance with and by means of brake torque reaction of said first brake means, second brake means applied by pressure from said second pressure generating means, and control valve means responsive to a predetermined minimum pressure differential between pressures generated by said first and second pressure generating means to fluid connect said first pressure generating means to said second brake means when the pressure differential is below a predetermined minimum and to fluid disconnect said first pressure generating means and said second brake means when the pressure differential s above the predetermined minimum.

13. In a brake system having first and second and third fluid pressure generating means, a first brake assembly actuated by pressure from said first pressure generating means, a second brake assembly actuated by pressure from said second pressure generating means, means selectively connecting said third pressure generating means to said second brake assembly to supply pressurized fluid to said second brake assembly until said second pressure generating means supplies pressurized fluid to said second brake assembly at a predetermined pressure level relative to the pressure level from said third pressure generating means, means responsive to pressure supplied by said third pressure generating means for venting said second brake assembly until a predetermined pressure is generated by said third fluid pressurizing means, and a single actuating means for substantially simultaneously actuating said first and third fluid pressurizing means.

References Cited by the Examiner

UNITED STATES PATENTS

| 2,385,812 | 10/1945 | Hoyt | 188—152 |
| 3,044,581 | 7/1962 | Leppeletier | 188—152 |
| 3,167,158 | 1/1965 | Brownyer | 188—141 |
| 3,175,647 | 3/1965 | Fabbro | 188—151 X |

MILTON BUCHLER, *Primary Examiner.*

G. E. A. HALVOSA, *Assistant Examiner.*